United States Patent [19]

Rowland

[11] 4,086,385

[45] Apr. 25, 1978

[54] FLAME RETARDED TEXTILES VIA DEPOSITION OF POLYMERS FROM OLIGOMERIC VINYLPHOSPHONATE AND POLYAMINO COMPOUNDS

[75] Inventor: Stanley P. Rowland, New Orleans, La.

[73] Assignee: The United States of America as represented by the Secretary of Agriculture, Washington, D.C.

[21] Appl. No.: 629,478

[22] Filed: Nov. 5, 1975

[51] Int. Cl.² .......................... C09D 5/18; C09K 3/28
[52] U.S. Cl. ..................................... 428/272; 252/8.1; 260/874; 260/928; 260/DIG. 24; 427/390 D; 428/276; 428/290; 428/921
[58] Field of Search ................... 427/390 D; 260/928, 260/DIG. 24, 874; 428/921, 272, 276, 290; 252/8.1; 206/15 FP

[56] References Cited

U.S. PATENT DOCUMENTS

| | | | |
|---|---|---|---|
| 2,470,042 | 5/1949 | McClean et al. | 427/390 X |
| 3,548,040 | 12/1970 | Sorstokke et al. | 260/986 |
| 3,565,679 | 2/1971 | Strother | 428/541 X |
| 3,641,202 | 2/1972 | Biranowski et al. | 260/869 |
| 3,671,304 | 6/1972 | Mischutin | 427/390 X |
| 3,695,925 | 10/1972 | Weil | 428/272 X |
| 3,891,727 | 6/1975 | Weil | 260/928 |

*Primary Examiner*—Harry J. Gwinnell
*Attorney, Agent, or Firm*—M. Howard Silverstein; David G. McConnell; Salvador J. Cangemi

[57] ABSTRACT

Network polymers containing phosphorus and nitrogen are deposited and fixed in cellulosic textiles by impregnating the textile with an aqueous solution of an oligomeric vinylphosphonate and a polyethyleneamine or polyethyleneimine and removing water from the impregnated textile to facilitate interaction between the chemical components, thus providing a process and a flame retarding composition for cellulosic textiles.

11 Claims, No Drawings

FLAME RETARDED TEXTILES VIA DEPOSITION OF POLYMERS FROM OLIGOMERIC VINYLPHOSPHONATE AND POLYAMINO COMPOUNDS

This invention relates to a flame-retardant finish for textiles. More particularly this invention relates to the application of an aqueous solution containing an oligomeric vinylphosphonate monomer and a coreagent from the class of polyethyleneamine or imine to provide a flameproofing finish to the treated cellulosic textile. The formulation can be heat catalyzed or allowed to cure at room temperature, and the resulting flame-retardant finish is durable to laundering.

This textile finish is useful for treatment of fabric, paper, non-woven sheets, filaments, staples, yarns, loose fibers, or products made therefrom.

BACKGROUND AND PRIOR ART

Various methods are known for flameproofing textile materials. These include treatments with chlorinated paraffins in combination with antimony oxide, treatment with tetrakis(hydroxymethyl)phosphonium chloride in combination with urea and/or N-methylol reagents, treatments with neutralized tetrakis(hydroxymethyl)phosphonium chloride in combination with ammonia, amides, or N-methylol compounds and, most recently, treatment with a combination of an oligomeric vinylphosphonate and an acrylic comonomer such as N-methylolacrylamide. The last-named system is decribed in U.S. Pat. No. 3,695,925. Each of these systems for attaining flame retardancy in textile materials has a characteristic set of attributes and deficiencies. A system approaching the optimum or ideal remains to be defined. In general, it is desirable to attain durable flame ratardancy in combination with durable-press or easy-care characteristics and with retention of low modulus (low stiffness), high strength, and high abrasion resistance.

It is an important object of the present invention to provide flame-retardant finishes that are effective on porous fibers, primarily cellulosic and other natural fibers, and that contribute various levels of flame retardancy to fibrous substrates with minimum increases in modulus (stiffness).

It is the further object to provide flame retardant textile finishes that may be employed to contribute various levels of flame retardancy to textile compositions together with high levels of retention of strength properties and abrasion resistance.

It is still another object of the present invention to provide the flame retarding textile finishes which are curable under very mild conditions and without the need for catalysis.

In the present invention, there is provided a process for flameproofing porous textile compositions with a combination of reagents that can be cured with a minimum of thermal energy to a durable textile finish that contributes flame retardancy and retains softness, strength, and abrasion resistance in the treated fabric.

THE PRESENT INVENTION

The process of this invention involves impregnation of a textile with an aqueous solution containing an oligomeric vinylphosphonate monomer and a polyamine. The preferred polyamines are selected from commercial materials which are sold under the terminology polyethyleneamine or polyethylenimine, which materials are constituted of several or a multitude of nitrogen atoms separated by ethylene units. The textile composition impregnated with this aqueous solution is subjected to a curing operation, after which the textile may be employed as such or it may be subjected to a washing or laundering procedure. The curing operation may be realized during evaporation of water from the fabric at room temperature or at an elevated temperature, as convenient.

The oligomeric vinylphosphonate may be prepared according to the process of U.S. Pat. No. 3,641,202 by reacting bis(2-chloroethyl) vinylphosphonate in the presence of basic alkali metal or alkaline earth metal compound at a temperature from about 140° C to about 250° C with removal of ethylenedichloride as it is formed. Oligomers prepared in this manner from bis(2-chloroethyl) vinylphosphonate with or without closely related comonomers including chloroethyl phosphates and phosphites are low in volatility and are completely soluble in water. Oligomers suitable for use in this invention should contain two, or preferably more, vinylphosphonate groups per molecule:

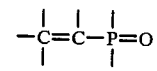

The remaining valences of the carbon atoms of the vinyl phosphonate groups are substituted with hydrogen and the remaining valences of the phosphorus atoms are substituted with alkoxy, haloalkoxy, hydroxyalkoxy, or oxyalkoxy, the last serving as a linkage between two phosphorus atoms. For sake of clarity, generalized formulas may be written as

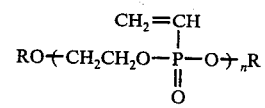

for a homopolymer and

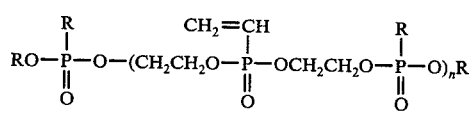

for a copolymer, where the R's represent residues of the alkyl groups, as noted above, resulting from the starting materials. In these structures, $n$ is an integer ranging from 2 to 20. An oligomeric vinylphosphonate that is commercially available and suitable for this invention is Fyrol 76, a product of Stauffer Chemical Company; it is described in Textile Chemist and Colorist 6 (8) 180–182 (1974) and in the Book of Papers of the National Technical Conference of AATCC, Oct. 9–11, 1974, New Orleans, La., pp. 448–451.

The preferred nitrogen-containing compounds are polyamines and polyimines. Specifically, these are compounds in which several or a multitude of nitrogen atoms are joined through 1,2-ethylene linkages, 1,2-propylene linkages, or 1,3-propylene linkages. The polyamines are water soluble and range in molecular weight from approximately 150 to 100,000. The preferred polyamine or polyimine compounds are available commercially under designations, such as polyethyleneamine or polyethyleimine.

Combinations of oligomeric vinylphosphonate and polyamino compounds provide homogeneous aqueous solutions suitable for application to textile substrates. Interaction between the two reagents occurs in the absence of catalyst to form a network polymeric structure in and on the fibrous substrate. Network polymer formation may be attained under conditions such as drying the impregnated substrate at 50°–100° C. Milder conditions, such as evaporation of water at room temperature, are effective as are also more strenuous conditions, such as evaporation of water from the impregnated substrate at temperatures above 150° C. Under the latter conditions, off-colors commonly develop; these may be avoided by conducting the drying at lower temperatures. Network polymer formation occurs at rates that are dependent upon the specific oligomeric vinylphosphonate and the specific polyamino compound; in certain cases, reaction occurs so readily that it contributes to instability of the reagent solution, which undergoes gelation prematurely. In other cases, the reagent solution or pad bath is stable for days or weeks. Although it is believed that the rate of gelation of the reagent solution and the rate of network polymer formation in the textile substrate are related to the number and type of amino groups in the polyamino compound, this is not clearly established. Since the rates of gelation and network formation are functions of time, concentration of reagents, and temperature, pad bath stability is increased at low temperature and low concentration of reagents. On the other hand, network polymer formation in fabric is facilitated by removal of water and elevation of temperature. In those cases in which pad bath stability remains a problem, gelation of reagents may be repressed by introduction of carbon dioxide into the solution of reagents. It is most convenient to introduce carbon dioxide as a gas into the aqueous solution of polyamino compounds prior to the addition of the oligomeric vinylphosphonate and supplementary agents.

The reagent systems or pad baths of this invention may optionally contain other ingredients of the type commonly employed for textile finishing: e.g., water and soil repellents, optical brighteners and colorants, softening agents, hand-modifying agents, buffering agents, and pH-controlling agents. Emulsified waxes, chlorowaxes, polyvinyl chloride, polyvinylidine chloride and other resinous finishing agents may be incorporated into the reagent systems of this invention.

The amount of oligomeric vinylphosphonate to be employed in the reagent solution is greatly dependent upon the product desired, i.e., the amount of flame retardance in the flameproofed textile substrate. Generally, the vinylphosphonate monomer should be employed in a concentration sufficient to introduce 0.1 to 10% phosphorus into the substrate with about 0.3–5% phosphorus effectively insolubilized in the textile substrate. These amounts will be greatly dependent upon the nature of the textile product, degree of flameproofing required, etc.

The amount of polyamino compound to be employed in this invention varies somewhat proportionately to the amount of oligomeric vinylphosphonate that is used. In general, on a weight basis, the polyamino compound will be present as a fraction of the total weight of the oligomeric vinylphosphonate. The polyamine serves two purposes: (1) as a coreagent for reaction with the oilgomeric vinylphosphonate for development of a network polymer which is fixed in the textile substrate, and (2) for fixation of nitrogen to supplement phosphorus and react as a synergist with the phosphorus for effecting flame retardancy. Therefore, the invention is operable over a wide range of ratios of the two reagents, but it is generally preferred to employ an amount of polyamine which, on a weight basis, is approximately 0.2 to 1.5 times that of the oligomeric vinylphosphonate.

The fixation reaction whereby the two reagents of this invention are insolubilized in and on the textile substrate requires no catalyst, thereby eliminating degradative attack of a catalyst on the cellulose chain structure.

The following examples are provided to illustrate the invention and should not be construed as limiting the invention in any manner whatever.

EXAMPLE 1

A solution was prepared from 7.3 parts of polyethylenimine, molecular weight range about 450–750, and 70 parts of water. To this was added 22.7 parts of an oligomeric vinylphosphonate prepared from bis(2-chloroethyl) vinylphosphonate as described in U.S. Pat. No. 3,641,202 and having a molecular weight range of about 500–1000. Cotton fabric was immersed in this solution, passed through squeeze rolls for a wet pickup of about 100%, and cured at 85° C for 20 minutes. The fabric was laundered, dried, weighed, and analyzed. The add-on of reagents was 20%; bound phosphorus and nitrogen were 2.45 and 1.51%, respectively. The fabric was self extinguishing when held at about 90° from the vertical. In the vertical flame test according to DOC FF 3-71, the average char length of three specimens was 9.5 inches.

EXAMPLE 2

Solutions were prepared to contain 8.6 parts of pentaethylenehexamine, 26.4 parts of oligomeric vinylphosphonate, and 65 parts of water (designated solution A) and 12.3 parts of pentaethylenehexamine, 37.7 parts of oligomeric vinylphosphonate, and 50 parts of water (designated solution B). Cotton sheeting was padded in each of these solutions, cured at 85° C for 20 minutes, rinsed in hot running tap water for 20 minutes, and air-dried. Add-ons were 17.2% and 22.5% from the separate treatments with solutions A and B, respectively. Both fabrics were soft but slightly off-white. The fabric from treatment with B solution passed the vertical flame test of specification DOC FF 3-71 with a char length of 5 inches. Both treated fabrics showed reduced flammability compared to the unmodified cotton fabric.

EXAMPLE 3

A reagent solution was prepared as described in Example 1 using 20.4 parts of the polyethylenimine, 22.0 parts of a vinylphosphonate oligomer having a molecular weight about double that employed in Example 1, and 57.6 parts of water. Cotton fabric was padded in this solution to a wet pickup of about 100%, cured, washed for 20 minutes in hot running tap water, and air dried. The cures were as follows: (a) 3 weeks at room temperature, (b) 3 minutes at 135° C, and (c) 3 minutes at 160° C. The add-ons of reagent that resulted from these conditions of cure were, respectively, (a) 27%, (b) 24.1%, and (c) 18.4%. A 65/35 cotton/polyester fabric, when treated under the same conditions, had add-ons of reagent as follows: (a) 20%, (b) 18%, and (c) 14.5%. All fabrics showed reduced flammability compared to the original fabrics, but only those having add-ons above 20% exhibited self extinguishing characteristics at angles greater than 90° from the vertical. These angles were measured in the manner that the angle between the hands of a clock at 12 o'clock is 0° and that between the hands at 6 o'clock is 180°.

EXAMPLE 4

A reagent solution was prepared to contain 8.23 parts of polyethylenimine, molecular weight range about 450–750, 31.8 parts of vinylphosphonate oligomer, and 60 parts of water. Cotton sheeting was padded in this solution, cured at 85° C for 20 minutes, laundered and tumble dried, and tested for textile performance. Relative to a laundered and tumble-dried sample of the original fabric, test results were as follows for treated fabric/original fabric; breaking strength 57.5/55.7 lbs; tearing strength 1007/1397 grams; Stoll flex abrasion 523/549 cycles; conditioned wrinkle recovery angle 208°/203°; wet wrinkle recovery angle 274°/164°; vertical flame test of DOC FF 3-71 passed/failed.

EXAMPLE 5

A pad bath similar to that in Example 1 was prepared from the following amounts of materials: 10.2 parts of polyethylenimine, 22.0 parts of oligomeric vinylphosphonate, and 67.8 parts of water. This reagent solution became increasingly viscous and finally converted to gel which would no longer flow during the course of about 55 minutes. A similar solution was prepared but carbon dioxide was bubbled into the aqueous solution of polyethylenimine prior to addition of the oligomer. This solution remained low in viscosity for an indefinite period of time. Samples of cotton fabric were added in freshly prepared solutions with and without the presence of carbon dioxide. This and subsequent steps were similar to those of Example 1. Add-ons of reagents were 24.3% for the reagent without carbon dioxide and 17.7% for the reagent containing carbon dioxide. After correcting for the fact that the reagent containing carbon dioxide was diluted about 10% with that material, it appears that the efficiency of reaction for the carbon dioxide-containing reagent was about 80% of that of the unmodified reagent.

EXAMPLE 6

Solutions were prepared to contain the following reagents: (a) 48.5 parts of polyethylenimine (33% concentration, molecular weight 50,000–100,000), 38 parts of oligomeric vinylphosphonate, sold by Stauffer Chemical Co. under the name Fyrol 76, and 69 parts of water; (b) 16.2 parts of polyethylenimine (molecular weight 450–750), 38parts of Fyrol 76, and 101 parts of water; and (c) 16.2 parts of polyethylenimine (molecular weight 1000–1400), 38 parts of Fyrol 76, and 101 parts of water. In each case the polyethylenimine was dissolved in water, the solution was cooled, and the oligomeric vinylphosphonate was added slowly with ice cooling. Samples of cotton printcloth were padded in these solutions, passed through squeeze rolls, and cured for 20 minutes at 85° C. The add-ons of polymers that were fixed in the cotton fabric were (a) 31%, (b) 27%, and (c) 29%. Each fabric showed a 180° match angle and a char length of about 3 inches in the vertical flame test specified in DOC FF 3-71. Each of the reagent systems described above underwent gelation during the course of an hour at 30° C. The pad baths were stable for longer periods at lower temperature or when carbon dioxide was introduced. Only small amounts of carbon dioxide were required to provide a substantial prolongation of stability of the pad baths.

We claim:
1. A process for imparting flame retardance to cellulosic textiles, the process comprising:
   (a) impregnating a cellulosic textile with an aqueous solution containing an oligomeric vinylphosphonate and a polyamino compound selected from the group consisting of a polyethylenamine and a polyethylenimine, and
   (b) curing the combination of reagents so as to effect interaction with one another in situ on said textile and yield a stable, insoluble, flame retardant finish.
2. A process according to claim 1, wherein said reagents are cured on said textile at a temperature ranging from ambient to about 180° C for a period of about from one minute to three weeks.
3. A process according to claim 1, wherein the textile is selected from the group consisting of cotton and cotton/polyester blends.
4. A process according to claim 1, wherein the oligomeric vinylphosphonate is present in sufficient amount to result in application of about from 0.1 to 10% of phosphorus on said textile.
5. A process according to claim 1, wherein the polyethyleneamine or polyethylenimine is present with respect to the oligomeric vinylphosphonate in solution in weight ratio ranging from about 2:10 to about 15:10 to form a network polymeric structure in and on the fibrous substrate.
6. A flame retardant textile comprising a fabric of cotton or cotton/polyester blend impregnated with a stable to laundering insoluble flame retardant polymer resulting from interaction of an oligomeric vinylphosphonate and a polyethyleneamine or polyethylenimine.
7. A textile according to claim 6, wherein the oligomeric vinylphosphonate is a condensation polymer of bis(2-chloroethyl) vinylphosphonate.
8. A process for imparting flame retardance to cotton and other cellulosic fabrics, the process comprising:
   (a) impregnating a cellulosic fabric to a wet pickup of about from 50 to 200% with an aqueous formulation containing about from 5–30% of an oligomeric vinylphosphonate monomer and a polyethyleneamine or polyethylenimine of molecular weight of about from 150 to 100,000, said polyethyleneamine or polyethylenimine in said formulation being present on a weight basis of about from 0.2 to 1.5 times with respect to the oligomeric vinylphosphonate, and
   (b) curing the wet impregnated textile at temperatures about from 20° to 160° C, for a period of time of about from 3 minutes to several hours to obtain a network polymeric structure in and on the fibrous substrate with a phosphorus content of about from 0.5 to 5% and a nitrogen content of about from 0.4 to 4% which retains its imparted flame retardance through laundering.
9. The process of claim 8 wherein the polyethyleneamine or polyethylenimine has a molecular weight of about 150–450.
10. The process of claim 8 wherein the polyethyleneamine or polyethylenimine has a molecular weight of about 450–1000.
11. The process of claim 8 wherein the polyethyleneamine or polyethylenimine has a molecular weight of about 1000–100,000.

* * * * *